United States Patent
McConnell

(10) Patent No.: US 10,580,236 B2
(45) Date of Patent: Mar. 3, 2020

(54) KEY FOB

(71) Applicant: Ulysse McConnell, Munich (DE)

(72) Inventor: Ulysse McConnell, Munich (DE)

( * ) Notice: Subject to any disclaimer, the term of this patent is extended or adjusted under 35 U.S.C. 154(b) by 0 days.

(21) Appl. No.: 15/898,620

(22) Filed: Feb. 18, 2018

(65) Prior Publication Data
US 2019/0259230 A1    Aug. 22, 2019

(51) Int. Cl.
*G07C 9/00* (2006.01)
*B60R 25/24* (2013.01)

(52) U.S. Cl.
CPC .......... *G07C 9/00309* (2013.01); *B60R 25/24* (2013.01); *G07C 2009/00325* (2013.01); *G07C 2009/00396* (2013.01); *G07C 2209/63* (2013.01)

(58) Field of Classification Search
CPC ............................ G07C 9/00309; B60R 25/24
USPC .................................................. 340/5.7–5.74
See application file for complete search history.

(56) References Cited

U.S. PATENT DOCUMENTS

| | | | | |
|---|---|---|---|---|
| 5,469,298 A * | 11/1995 | Suman | .................... | G02B 27/01 296/37.7 |
| 9,727,721 B2 * | 8/2017 | Wang | ....................... | H04M 1/67 |
| 2002/0190842 A1 * | 12/2002 | Sasaki | ................. | G07C 9/00182 340/5.31 |
| 2006/0071808 A1 * | 4/2006 | Nagata | ................. | B60R 25/2072 340/13.24 |
| 2008/0266068 A1 * | 10/2008 | Farrell | ................. | B60R 25/2072 340/426.17 |
| 2009/0033459 A1 * | 2/2009 | Ichihara | .............. | B60R 25/2036 340/5.28 |
| 2009/0224876 A1 * | 9/2009 | McCall | ............... | B60R 25/2009 340/5.61 |
| 2010/0007462 A1 * | 1/2010 | Biondo | ................... | G08C 17/02 340/5.72 |
| 2011/0054735 A1 * | 3/2011 | Kamiya | ................ | B60R 25/245 701/36 |
| 2011/0115605 A1 * | 5/2011 | Dimig | ....................... | B60L 1/00 340/5.61 |
| 2011/0153121 A1 * | 6/2011 | Minassian | ............... | B60R 25/24 701/2 |
| 2012/0105196 A1 * | 5/2012 | Katou | ................... | B60R 25/245 340/5.64 |
| 2015/0161831 A1 * | 6/2015 | Shon | .................. | G07C 9/00007 340/5.61 |
| 2015/0343993 A1 * | 12/2015 | Ferrieres | ................. | B60R 25/04 701/2 |
| 2017/0147959 A1 * | 5/2017 | Sweeney | .............. | G05D 1/0022 |

* cited by examiner

*Primary Examiner* — Allen T Cao

(57) ABSTRACT

A key for locking and unlocking a car is disclosed, which is configured to send a first signal which, when the car is locked and the first signal is received, causes the car to unlock, and to send a second signal which, when the car is unlocked and neither the first signal nor the second signal is received, causes the car lock, and the key sends the first signal only upon a signal from a user to unlock the car. The car recognizes a first wireless transmission which, when the car is locked and the first signal is received, causes the car to unlock, and recognizes a second wireless transmission such that, when the car is unlocked and neither the first nor the second signal is received, causes the car to lock, and the first signal is received only upon a user giving a signal to unlock the car.

20 Claims, 5 Drawing Sheets

KEY FOB

BACKGROUND

Drivers and other users of cars appreciate the convenience of doors which unlock when they arrive, and lock again when they go away—and the same holds for anything which should be available for authorized users, and locked for anyone else. The instant invention is directed to improvements in locking and unlocking, especially in the context of a car. This can improve security over existing systems.

A simple remote lock and unlock system may use a key fob with buttons for a user to unlock and lock e.g. a car. Such a system has the disadvantage that the user must push the unlock button when the key fob is within signalling range of the car, meaning that the user must typically have one hand free to press the button. Likewise, when leaving the car, the user must have a hand free to lock the door—and must also remember to operate the lock.

An alternative system, often called "keyless" because there is no need to take a key fob in the hand, uses a key fob which continuously or regularly broadcasts a signal. When the car detects the signal in its proximity, it unlocks the door. When the signal is no longer in proximity, the car locks the door again.

Keyless locking and unlocking is an improvement over buttons, because the user no longer needs a hand free to operate the lock; proximity of the key fob is enough to unlock and lock the car.

The idea is that the key opens the car only when it is in physical proximity to the car. However, it has proven possible to "fool" a car into believing the key is in proximity by using a radio relay. The relay consists of transcievers, which transmit the weak signals exchanged between a key fob and a car over long distances, typically using a different radio system. The car detects the presence of the key and performs a verification, for example a challenge/response. If the key answers correctly, the car assumes that the key is nearby, and unlocks. The car assumes that a successful exchange with the key imies that the key is in proximity, because the radio system used does not work over long distances. The car may use alternate approaches to testing the physical proximity, such as a GPS assist for bot car and key fob, or by measuring the time of transmission. However, these alternatives may not be secure or precise enough.

The instant invention offers an alternative improvement wherein, in some embodiments, a time or time window is created within which the car accepts a request rom the key fob to unlock as being a valid request from a key in proximity. The time window may be an instant when the key fob gets a signal from the user—e.g. a key press—or it may be a limited amount of time during which the key signals to the car that the car should unlock when it determines that the key is in proximity. In one embodiment, the key fob may transmit two different signals, namely one signal as an unlock signal to unlock the car, and the other as an identification signal which, when it disappears, is taken as a signal to lock the car. In this way the key fob establishes a time or time window when the car will respond to proximity of the key by unlocking the car. A relay attack can thus only work in the time between when the user signals that the car should unlock, and the time when the car does unlock.

DETAILED DESCRIPTION

Figure 1:
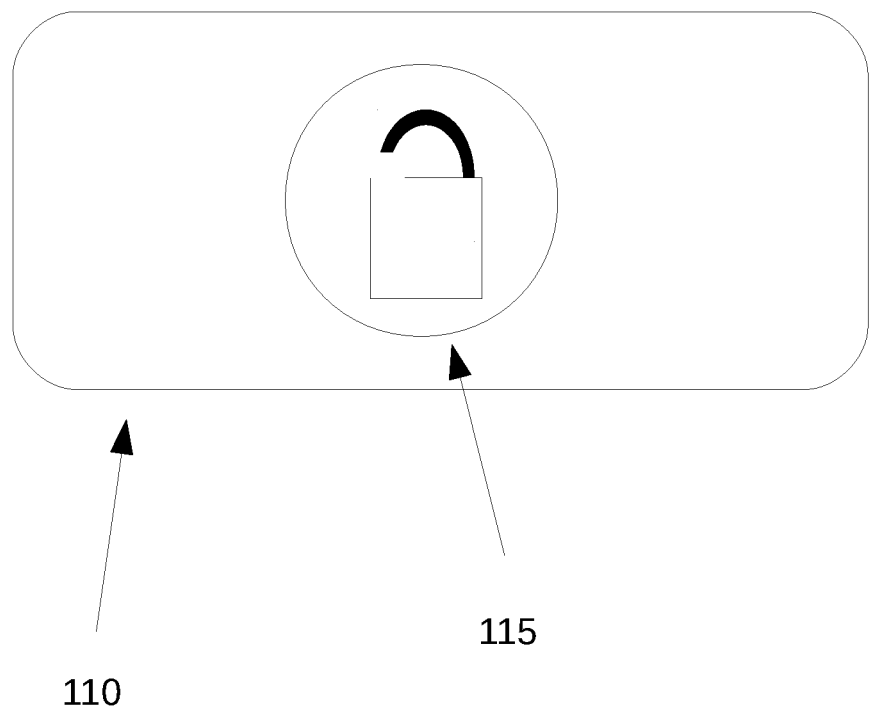
FIG. 1 shows a key fob according to one embodiment of the invention.

The key fob 110 of one embodiment of the invention, as shown in FIG. 1, has a button 115 which the user can press to signal to the key fob that the user would like to unlock the car. The key fob takes this signal as an indication to start the mode in which the car is to unlock. The key in turn sends the signal for the car to unlock.

The key fob may take the signal to unlock as an instantaneous command to broadcast the signal which unlocks the car, or as a command to continuously broadcast the signal which unlocks the car for a duration of a limited time. The duration might be predefined as being for several seconds, or for several minutes, or for one or more hours. The duration may be predefined as an absolute time, or may be defined as a varying duration which is generally sufficient. For example, the duration may be defined as approximately 5 minutes, or approximately 30 minutes.

The duration may be chosen such that a user has enough time to arrive at the car and drive away with the car, but not so long as to unlock the car unnecessarily.

A key fob may also have further buttons, e.g. to lock the car, turn on lights, open the trunk, etc. These buttons may also have an instantaneous effect, or an effect which has a certain duration.

The key fob may also broadcast a signal to identify itself. It may broadcast this identification signal when it does not broadcast a signal to unlock, or it may broadcast the identification signal at all times. It may broadcast this signal continuously, or it may broadcast this signal at intervals. The intervals may be chosen to save energy, and in particular to conserve battery life. The intervals may be chosen to maintain contact with the car, so that the car has the information that it is able to receive broadcast signals from the key. The intervals may be of less than a second, or of several seconds, or of several minutes.

When the car receives the identification signal, it may not lock. The car may lock when it does not receive the identification signal. The car may lock when it does not receive the signal and it is not in operation. The car may not lock while in operation, even if it doesn't receive the signal, for safety reasons.

The unlock signal and the identification signal may operate as a pair, such that the car unlocks when it receives the unlock signal, and locks when it no longer receives the identification signal, subject to the conditions described above and delays as appropriate. In this way, the car may be responsive to the presence of the key fob.

Figure 2:
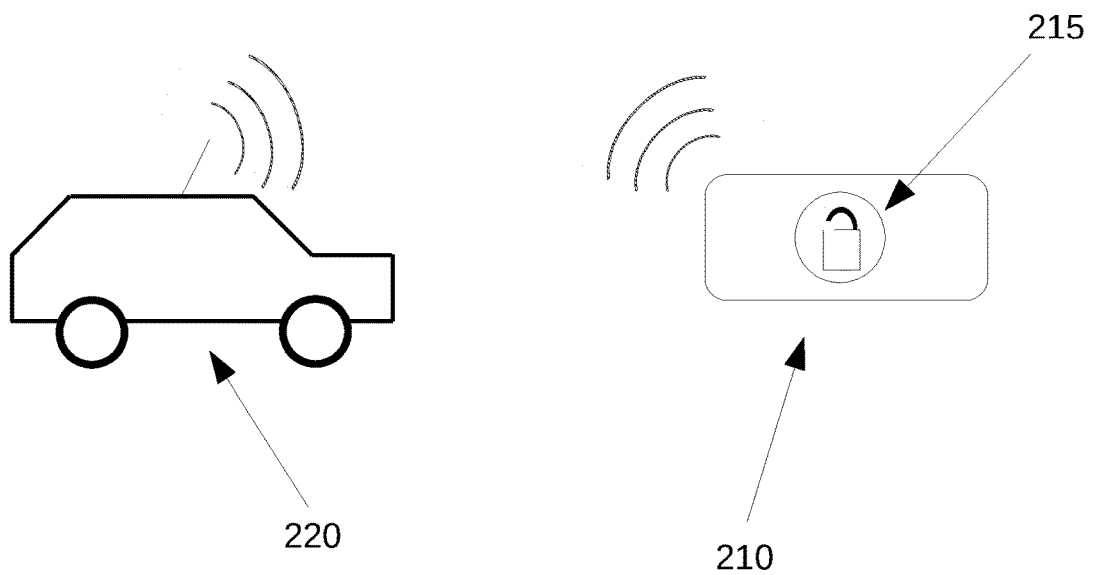
FIG. 2 shows interaction between key fob and car.

FIG. 2 shows a key or key fob 210 which serves to unlock a car 220. The user presses the button 215 of the key to signal to the key that the car should be unlocked. The key in turn signals to the car to unlock. The key may continue to broadcast the signal to unlock the car for a defined duration. The key may broadcast the signal to unlock while the car cannot receive the signal. The car may not receive the signal because the key is too far away from the car.

The user may, for example, walk towards the car, and with the physical displacement of the key, the signal broadcast by the key will be received by the car. The key may continue to broadcast the signal to unlock starting when the button is pressed, and continue to broadcast for a duration of time which is long enough for the car to receive the signal at a later time than the time when the button was pressed.

When the car receives the signal to unlock from the key, the car unlocks. The car may be ready to start after unlocking. The user may enter the car and start the car and drive away with the car after the car unlocks.

Figure 3:
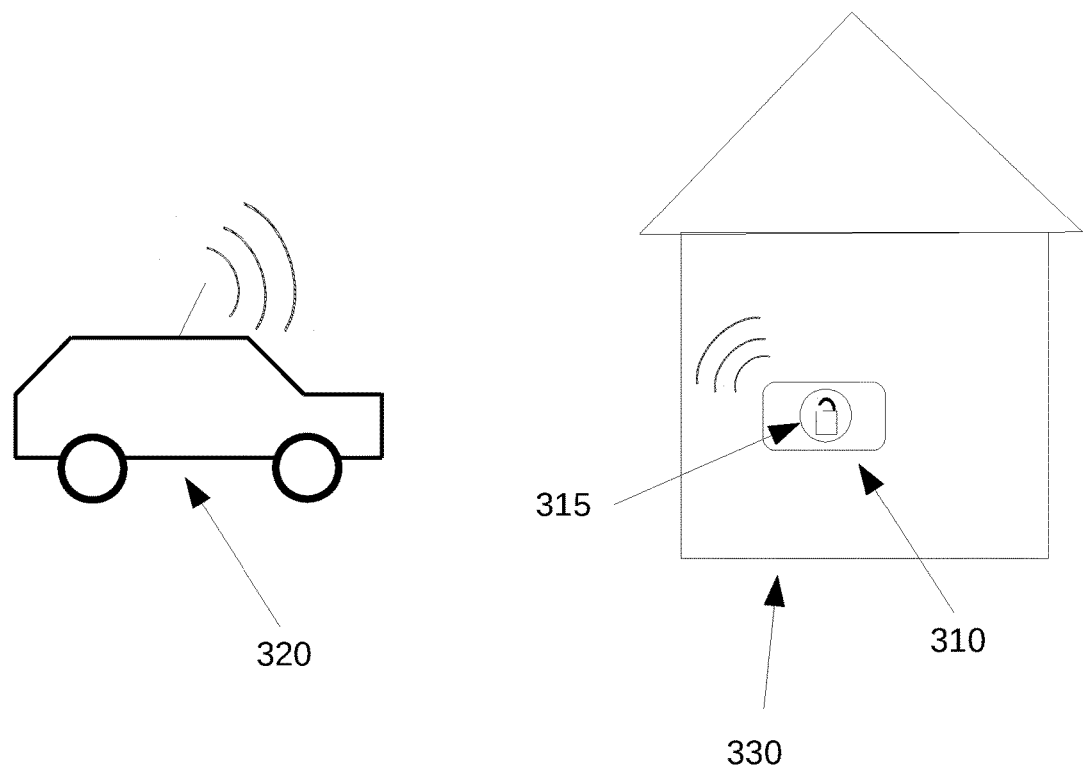
FIG. 3 shows a typical use case for the invention.

FIG. 3 shows a possible use case for an embodiment of the invention. A user is at home and the car 320 is parked outside the house 330. The car cannot receive signals broadcast by the key, because the key 310 is too far away and inside the house. The user presses the button 315 to unlock the car. In one use case, the key broadcasts the signal to unlock and the car receives the signal and unlocks. The user may start the car and drive away.

In another use case, the key broadcasts the signal to unlock, but the car does not receive the signal. The key continues to broadcast the signal to unlock for several minutes. The user walks to the car, and as the user approaches the car, the car receives the signal to unlock. When the car receives the signal, the car unlocks. The user may start the car and drive away.

When the user finishes with the car, the user may leave the car. While the car receives an identification signal from the key, the car does not lock. When the car does not receive the identification signal, the car may lock. The car may lock subject to the condition that it does not receive the unlock signal and does not receive the identification signal.

Figure 4:
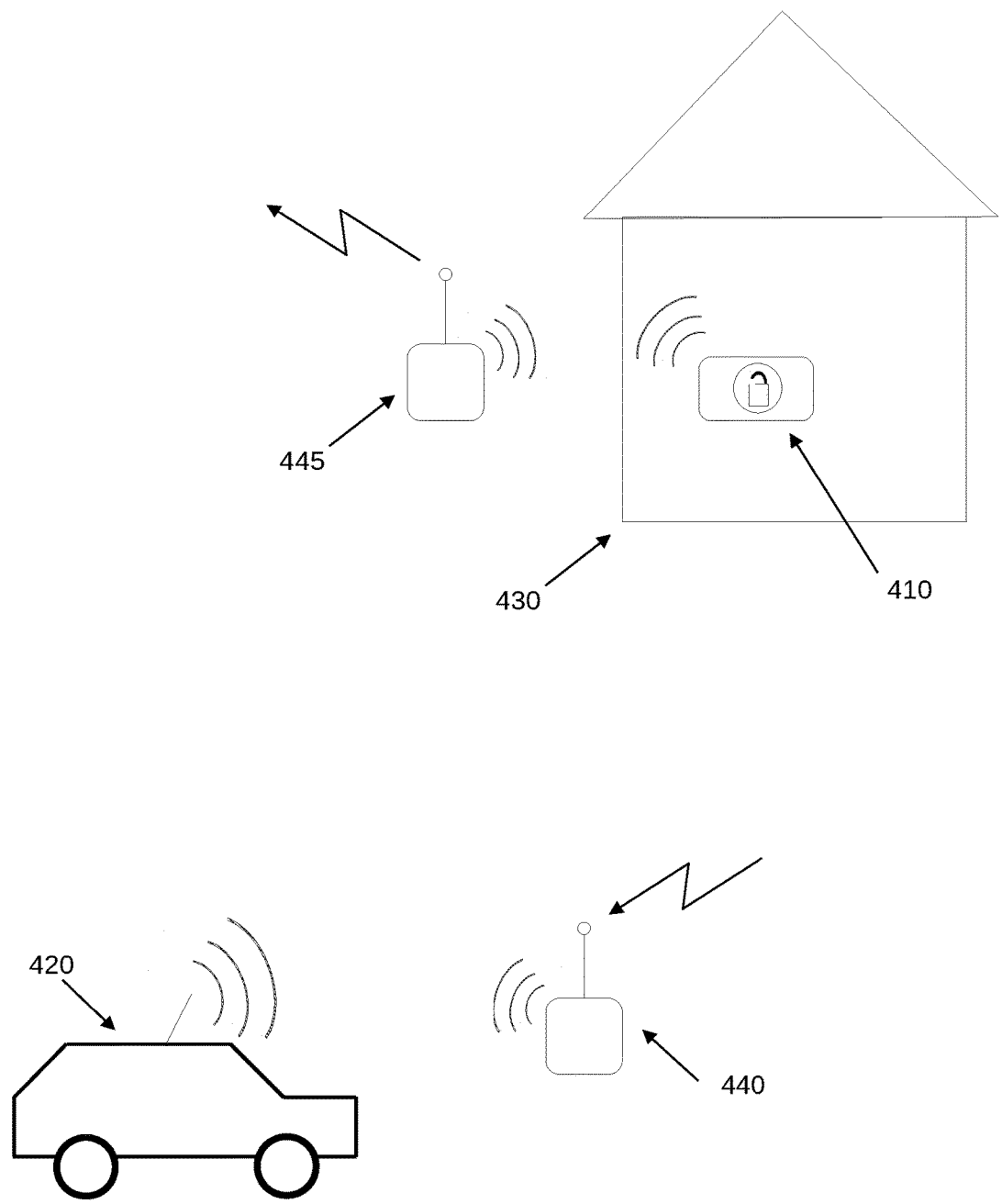
FIG. 4 shows a relay attack.

FIG. 4 shows a relay attack, whereby two theives may steal a car. In this case, the key 410 broadcasts continuously a signal. The car unlocks when it receives this signal. This signal might be both an unlock signal and an identification signal. In this use case, one thief brings a transceiver 440 close to the car 420, and the other thief brings a transceiver 445 close to the house 430. The transceiver 445 receives the signal from the key 410, and relays the signal to the transceiver 440, which broadcasts in turn to the car 420. The transceiver 440 may also receive response signals from the car and relay these to the transceiver 445, which broadcasts these. The signals relayed by the transceivers may include a challenge-response. The broadcast response signals from the transceiver 445 may be received by the key 410.

The car may receive the relayed signal from the key, and may unlock. A thief may enter the car and start the car and drive away with the car after the car unlocks. The car may not lock even when it no longer receives the relayed signal. The car may not lock for safety reasons, for example because the car does not lock until the motor is turned off.

Figure 5:
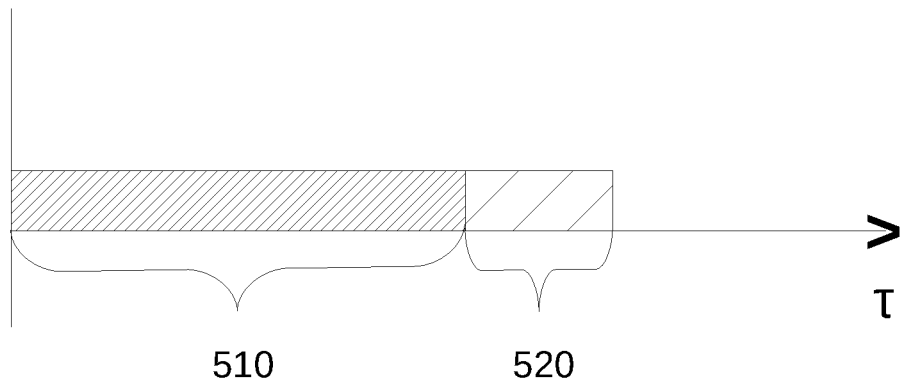
FIG. 5 shows the signals sent over time in an embodiment.

FIG. 5 shows the signals of the invention sent over time. In one embodiment, the key broadcasts either an unlock signal or an identification signal. The key may broadcast the identification signal 510 before it receives the signal from the user to unlock. The key may broadcast the unlock signal 520 after it receives the signal from the user to unlock. The key may broadcast the unlock signal while it receives the signal from the user to unlock. The key may broadcast the unlock signal for a predetermined time after it receives the signal from the user to unlock. The key may stop broadcasting the unlock signal 520 after the predetermined time is over. The car may lock when the user leaves the car, and the car no longer receives either the unlock signal 520 or the identification signal 510. The key may continue to broadcast the identification signal 510 while it broadcasts the unlock signal 520, or it may broadcast only the one signal or the other signal. The key may broadcast an identification signal after it stops broadcasting the unlock signal.

Figure 6:
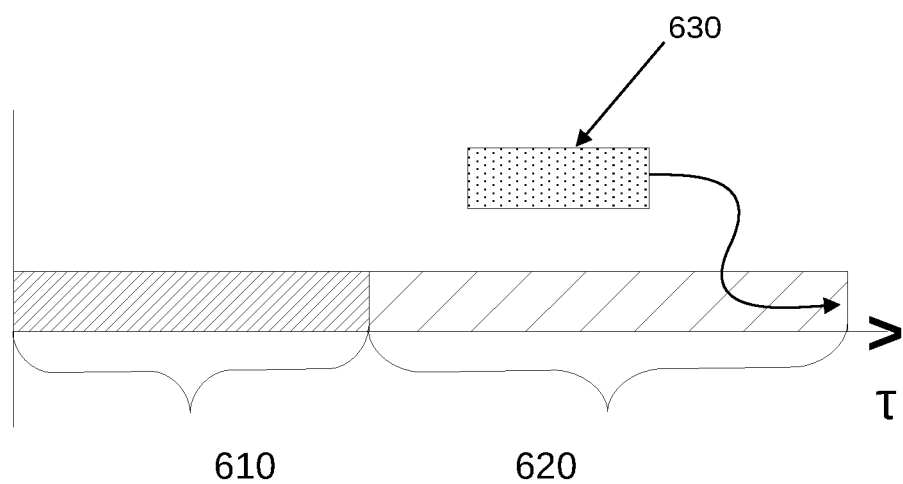
FIG. 6 shows the signals sent over time in another embodiment.

In another embodiment, the key may also receive a presence signal 630 from the car. One use case for this embodiment of FIG. 6 is a user who unlocks the car, and then drives the car. The key is aware that it is in a car which is being used, because it receives a presence signal. If the user stops the car briefly, for example to buy a coffee, and then returns to the car, the user need not signal to the key again that the key should unlock the car.

The key may continue to broadcast the unlock signal 620 while it receives the presence signal 630. The key may continue to broadcast the unlock signal for a predetermined time after it receives the presence signal and then no longer receives the presence signal. The car locks when the user leaves the car, and the key continues to send the unlock signal for a predetermined time after it no longer receives the presence signal.

In another embodiment, the key broadcasts the unlock signal 620 when it receives the signal from the user to unlock, i.e. the button is pressed. The key may continue to broadcast the unlock signal until it receives the presence signal 630. The key may stop broadcasting the unlock signal when it no longer receives the presence signal, or it may stop broadcasting after a first predetermined time after it receives the presence signal, or after a second predetermined time (timeout time) has elapsed without receiving the presence signal. When key does not get the signal to unlock from the user and does not receive the presence signal, then the key sends no signal. In one embodiment, the identification signal 610 is no signal, and in another embodiment it is a specific identification signal.

In this specification the object to lock and unlock is a car, but other objects such as a boat or a structure such as a house may also be locked and unlocked with the inventive concept.

I claim:

1. A key for locking and unlocking a car, configured to send an unlock time window signal which, when the car is locked and the unlock time window signal is received, causes the car to unlock, and to send an identification signal such that, when the car is unlocked and neither the unlock time window signal nor the identification signal is received, the car will lock, wherein the key sends the unlock time window signal only upon a signal from a user to unlock the car.

2. The key of claim 1, wherein the key sends the unlock time window signal for at least a predetermined duration upon a signal from a user to unlock the car.

3. The key of claim 2, wherein the predetermined duration is approximately 5 minutes.

4. The key of claim 1, wherein the key sends the unlock time window signal wirelessly as a radio broadcast.

5. The key of claim 1 wherein the signal from a user to unlock the car comprises pressing an unlock button.

6. The key of claim 1 wherein the key sends the identification signal continuously or at regular intervals.

7. The key of claim 1 wherein the car locks only when it is also no longer in operation.

8. A car which recognizes a first wireless transmission which, when the car is locked and an unlock time window signal is received, causes the car to unlock, and recognizes a second wireless transmission such that, when the car is unlocked and neither the unlock time window nor an identification signal is received, causes the car to lock, wherein the unlock time window signal is sent only upon a user giving a signal to unlock the car, and the identification signal is sent without the user giving a signal to unlock.

9. The car of claim 8, wherein the car locks only after it has stopped operation and receives neither signal.

10. The car of claim 8 which only locks after a delay.

11. The car of claim 8 which sends a presence signal to indicate presence to the key.

12. The car of claim 8 wherein the key responds to the presence signal by continuing to send the unlock signal.

13. The car of claim 11 wherein sending the identification signal comprises sending no signal.

14. A method of locking and unlocking a car, comprising sending an unlock time window signal which, when the car is locked and the unlock time window signal is received, causes the car to unlock, and sending an identification signal such that, when the car is unlocked and the identification signal is no longer received, causes the car to lock, wherein the unlock time window signal signal is sent only upon a signal from a user to unlock the car.

15. The method of claim 14, wherein sending the unlock time window signal comprises sending the unlock time window signal for at least a predetermined duration upon a signal from a user to unlock the car.

16. The method of claim 15, wherein the predetermined duration is approximately 5 minutes.

17. The method of claim 14, wherein the key sends the unlock time window signal wirelessly as a radio broadcast.

18. The method of claim 14 wherein the signal from a user to unlock the car comprises pressing an unlock button.

19. The method of claim 14 wherein the identification signal is sent continuously or at regular intervals.

20. The method of claim 14, wherein the car locks only after it has stopped operation and receives neither signal.

\* \* \* \* \*